United States Patent
Chougle et al.

(10) Patent No.: US 9,307,001 B2
(45) Date of Patent: Apr. 5, 2016

(54) VIDEO FEED LAYOUT IN VIDEO CONFERENCES

(71) Applicant: International Business Machines Corporation, Armonk, NY (US)

(72) Inventors: Abdullah Q. Chougle, Pune (IN); Vishal V. Chougule, Pune (IN); Bhavuk Srivastava, Pune (IN)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 14/279,678

(22) Filed: May 16, 2014

(65) Prior Publication Data

US 2015/0334313 A1     Nov. 19, 2015

(51) Int. Cl.
*H04N 7/15*     (2006.01)
*H04L 29/06*     (2006.01)
*H04N 5/262*     (2006.01)

(52) U.S. Cl.
CPC .......... *H04L 65/602* (2013.01); *H04L 65/1083* (2013.01); *H04N 5/2624* (2013.01); *H04N 7/15* (2013.01); *H04N 7/152* (2013.01)

(58) Field of Classification Search
CPC ........... H04N 7/15; H04N 7/152; H04N 7/14; H04N 7/142; H04L 12/1822; G06F 15/16
USPC .............................. 348/14.01–14.16; 709/204
See application file for complete search history.

(56) References Cited

U.S. PATENT DOCUMENTS

| | | |
|---|---|---|
| 6,288,740 B1 | 9/2001 | Lai et al. |
| 7,554,571 B1 | 6/2009 | Beck et al. |
| 7,797,383 B2 | 9/2010 | Baird |
| 8,350,891 B2 | 1/2013 | Khot et al. |
| 8,406,608 B2 | 3/2013 | Dubin et al. |
| 2007/0124395 A1 | 5/2007 | Edge et al. |

(Continued)

FOREIGN PATENT DOCUMENTS

| | | |
|---|---|---|
| WO | 2011137290 A2 | 11/2011 |
| WO | 2011143434 A1 | 11/2011 |

(Continued)

OTHER PUBLICATIONS

Anonymous, "System and method for contextual grouping in an eMeeting", An IP.com Prior Art Database Technical Disclosure, Apr. 9, 2012, IP.com No. IPCOM000216459D. http://ip.com/IPCOM/000216459.

(Continued)

*Primary Examiner* — Melur Ramakrishnaiah (74) *Attorney, Agent, or Firm* — Richard A. Wilhelm; Bill Chan (57) ABSTRACT

A method for positioning video feeds of a video conference on an electronic display. The method includes selecting a first property of the plurality of video feeds used to position the plurality of video feeds on the electronic display. A first and second value of the first property is received from a respective first and second video feed. A request for a layout style of the plurality of video feeds on the electronic display is received. The layout style has a plurality of positions for the plurality of video feeds. Each of the plurality of positions has a criteria of the first property. The first and second video feed belong is positioned on the layout. The positioning is based on a relationship of the criteria of each of the plurality of positions to the first and second values.

9 Claims, 9 Drawing Sheets

(56) References Cited

U.S. PATENT DOCUMENTS

| | | | |
|---|---|---|---|
| 2007/0299981 | A1 | 12/2007 | Baird |
| 2010/0002069 | A1 | 1/2010 | Eleftheriadis et al. |
| 2010/0103245 | A1 | 4/2010 | Decker et al. |
| 2011/0279639 | A1 | 11/2011 | Anand et al. |
| 2012/0162355 | A1 | 6/2012 | Cheng et al. |
| 2012/0166534 | A1* | 6/2012 | Bentley et al. ............... 709/204 |
| 2013/0188007 | A1 | 7/2013 | Duong |
| 2013/0328998 | A1* | 12/2013 | Duckworth et al. ....... 348/14.07 |
| 2014/0340467 | A1* | 11/2014 | Kajarekar et al. ......... 348/14.08 |
| 2015/0056972 | A1* | 2/2015 | Bartlett et al. ................ 455/418 |

FOREIGN PATENT DOCUMENTS

| | | |
|---|---|---|
| WO | 2011143440 A1 | 11/2011 |
| WO | 2013062581 A1 | 5/2013 |

OTHER PUBLICATIONS

Handley et al., "SDP: Session Description Protocol", Network Working Group, RFC 4566, Jul. 2006, Copyright © The Internet Society (2006).

IBM, "Visual representation of participant roles in an on-line meeting or chat, and visual representation used to influence the meeting flow", An IP.com Prior Art Database Technical Disclosure, Apr. 9, 2009, IP.com No. IPCOM000181704D. http://ip.com/IPCOM/000181704.

Rosenberg et al., "A Session Initiation Protocol (SIP) Event Package for Conference State", RFC 4575 Conference Package, Aug. 2006, Copyright © The Internet Society (2006).

Chougle, et al., "Video Feed Layout in Video Conferences", U.S. Appl. No. 14/645,774, filed Mar. 12, 2015.

List of IBM Patents or Patent Applications Treated As Related.

* cited by examiner

VIDEO FEED LAYOUT IN VIDEO CONFERENCES

BACKGROUND

The present disclosure relates to video conferencing, and more specifically, to the layout of video feeds on an electronic display of participants in the video conference.

Real-time communication has become vital to organizations that have a geographical reach and presence across different regions, in different countries, and across continents. It is invaluable for organizations to be able to have their employees interact not only with each other but also provide a way to reach out to clients and partners using real-time video conferencing systems in order to provide better productivity and customer satisfaction. Video conferencing systems provide the feeling or presence and face to face meeting even while working remotely.

SUMMARY

According to embodiments of the present disclosure, embodiments include a method, system, and computer program product for presenting a plurality of video feeds of participants in a video conference on an electronic visual display. An aspect includes selecting a first property of the plurality of video feeds. The first property is used to position the plurality of video feeds on the electronic visual display. A first value of the first property is received from a first video feed of the plurality of video feeds. A second value of the first property is received from a second video feed of the plurality of video feeds. A request for a layout style of the plurality of video feeds on the visual display is received. The layout style has a plurality of positions for the plurality of video feeds. Each of the plurality of positions has a criteria of the first property. Aspects include determining positioning the respective first video feed and second video feed on the visual display. The position is based on a relationship of the criteria of each of the plurality of positions to the first value and the second value. The first video feed and the second video feed is sent to the electronic visual display in the video feeds determined positions of the layout style to be displayed.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

DETAILED DESCRIPTION

Aspects of the present disclosure relate to video conferencing, and more specifically, to creating a layout of video feeds on an electronic display of participants in the video conference. While the present disclosure is not necessarily limited to such applications, various aspects of the disclosure may be appreciated through a discussion of various examples using this context. In various embodiments, a video conference may have a plurality of video feeds from a plurality of participants that may be displayed on an electronic display of a participant. The participant may be a participant in the video conference or a viewer. The participant may select one or more common properties of each video feed in which the one or more properties are used to determine to distinguish each of the video feeds from each other. For instance, the participant may select a role property where the video feeds are distinguished based on the position the participant of a video feed may have in an organization. Another example is a geographical property where the video feeds are distinguished based on the geographical location of the participant of the video feed. The participant may also select a layout style that has a plurality of positions that have a certain criteria of the selected property at which a particular video feed may be located. For instance, when the geographical property is selected, a video feed from India may be placed at position of the layout style of a world map where the country India is located. In a role property scenario, a higher designated role in the organization or video conference may at a layout style position such as a more prominent position on the electronic display and at a position that has a larger display area compared to other video feeds.

Audio and video conferencing has been made possible in part due to an increase in the availability of network bandwidth. The technology has advanced in the area of complex video and audio codecs that provide not only the high quality video but also a better compression ratio. Other advancements have been made such that a single video from an end point consists of not only a single resolution, but multiple layers of video streams. The layers may be stacked in three dimensions to provide scalability of resolution, frame-rate and quality (bit-rate).

Multiple views of video feeds may be formed using a rectangular grid pattern such that there are 2×2 or any such pattern where the window is created and selected of the remote video streams being received. Another mechanism is to have hardware based multi-conference units (MCUs), which select and form the layout of the video conference at its own end depending on what the participant has selected and sends a single stream of video with a composite sub-video streams arranged as per the requested layout. Embodiments herein provide for a way for a participant of a video conference to have a personalized view of the layout based on properties such as different participant's roles, location, meeting type, and time of joining the conference.

Figure 1:
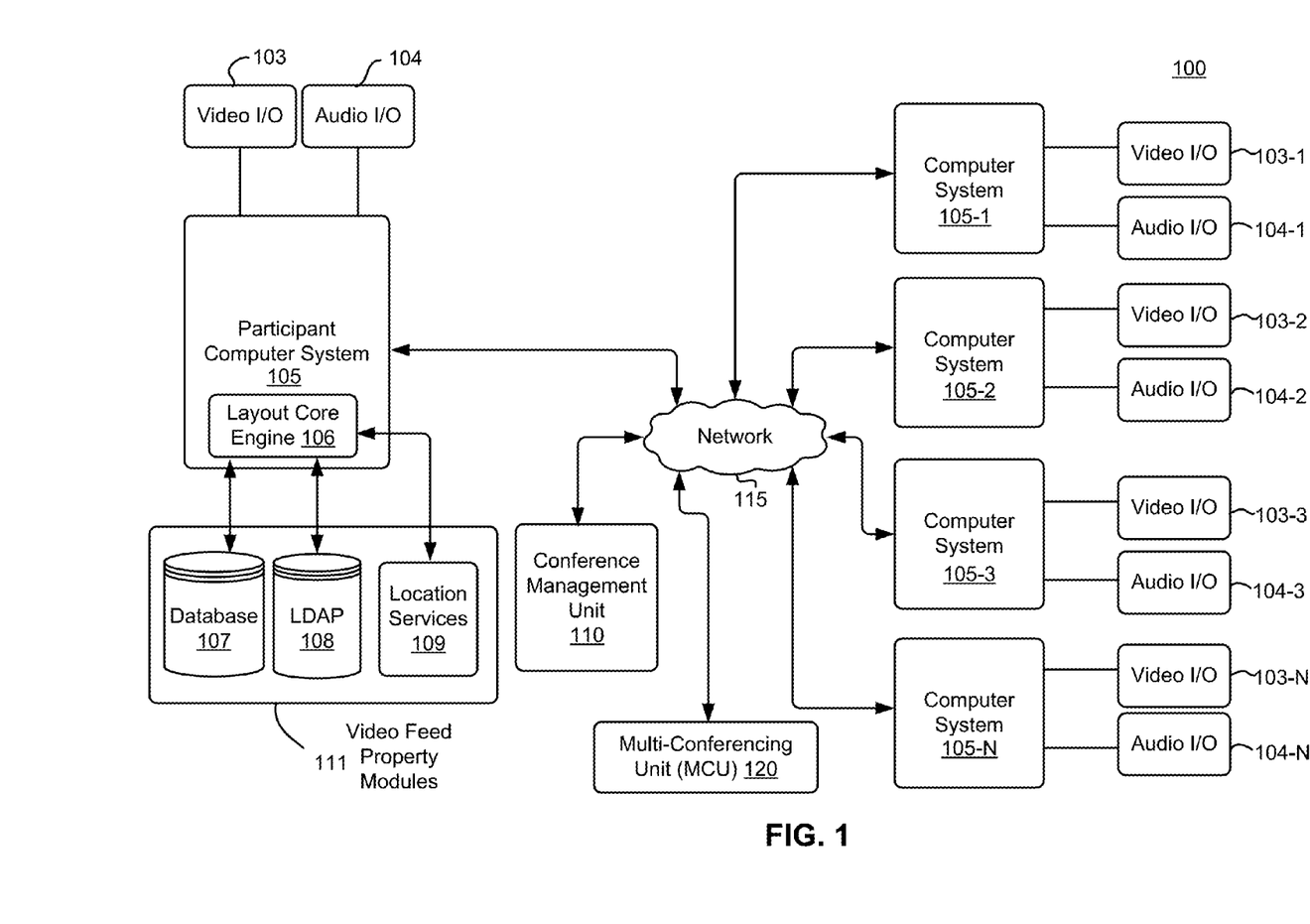
FIG. 1 illustrates a diagram of a video conference system for creating a layout of a plurality of video feeds of a video conference on an electronic visual display, according to various embodiments.

FIG. 1 depicts a diagram of a video conference system 100 for creating a layout of a plurality of video feeds of a video conference on an electronic visual display, according to various embodiments. The video conference system 100 may have a plurality of participant computer systems 105, 105-1, 105-2, 105-3, and 105-N all communicatively coupled over a network 115. Network 115 may include, but is not necessarily limited to, local area network(s) (LANs), wide area network(s) (WANs), the global Internet, proprietary networks, private networks, and combinations thereof.

The participant computer systems 105-105-N may include one or more computer processor circuits, logic circuits, and memory circuits that are configured to provide an interface with external systems and carry out a video feed layout process. Each participant computer system may include a respective video input/output (I/O) device 103, 103-1, 103-2, 103-3, and 103-N and a respective audio I/O device 104, 104-1, 104-2, 104-3, and 104-N. A video output device may be an electronic visual display such as, but not limited to, standalone display screen, computer monitor, television, or a tablet or handheld device display. A video input may be a camera or video camera that captures images of the participants using the computer system. The audio input devices may be a microphone or device that captures sound by transferring sound into electrical signals. An audio output device may be a speaker, headphones, or ear bud that can take electronic audio signals and convert the signals into sound. The video I/O devices 103-103-N and audio I/O devices 104-104-N may send and receive audio and video of the participants between the plurality of computer systems 105-105-N in the video conference system 100

According to various embodiments, the participant computer system 105 may include a layout core engine 106. Although the layout core engine 106 is illustrated in FIG. 1 as being in participant computer system 105, it may be located in some or all of the other computer systems that are part of the video conference system 100. The layout core engine 106 may be communicatively coupled locally or over the network 115 with a plurality of video feed property modules 111 that may include an lightweight directory access protocol (LDAP) service 108, a location service 109, and one or more databases 107 to get video feed properties such as, but not necessarily limited to, location, roles, and skills of the participants of a video conference.

Consistent with embodiments, the layout core engine 106 may be configured to receive a plurality of video feeds from the plurality of computer systems. The layout core engine 106 may also receive data from the plurality of video feeds and data from the video feed property modules 111. The data may include values of various properties of the participants in the video feeds. The layout core engine 106 may be configured to receive a layout style request to display a layout of the video feeds on the video output of the computer system 105. The layout of video feeds may have a plurality of positions for the various video feeds. The positions may be based on one or more properties of the various participants and the positions may have a criteria for positioning a particular video feed in the layout at the position. The criteria may be specific geographical location values or rank values of the individual participants. According to embodiments, the layout core engine 106 may be configured to create a layout of the video feeds by determining whether one or more values of the participants meet the criteria of specific position. The determined layout with the video feeds of the video conference may be displayed on the video I/O device 103.

The computer systems may also be communicatively coupled over the network 115 to a conference management unit 110 and a multi-conferencing unit (MCU) 120. The conference management unit 110 may be controlled by a moderator. The conference management unit may establish and manage a video conference. The MCU 120 may be responsible for routing and managing video and audio between the computer systems participating in the video conference. It may include video application program interfaces (APIs) and audio APIs to interface the I/O devices of the various computer systems in the video conference.

Figure 2:
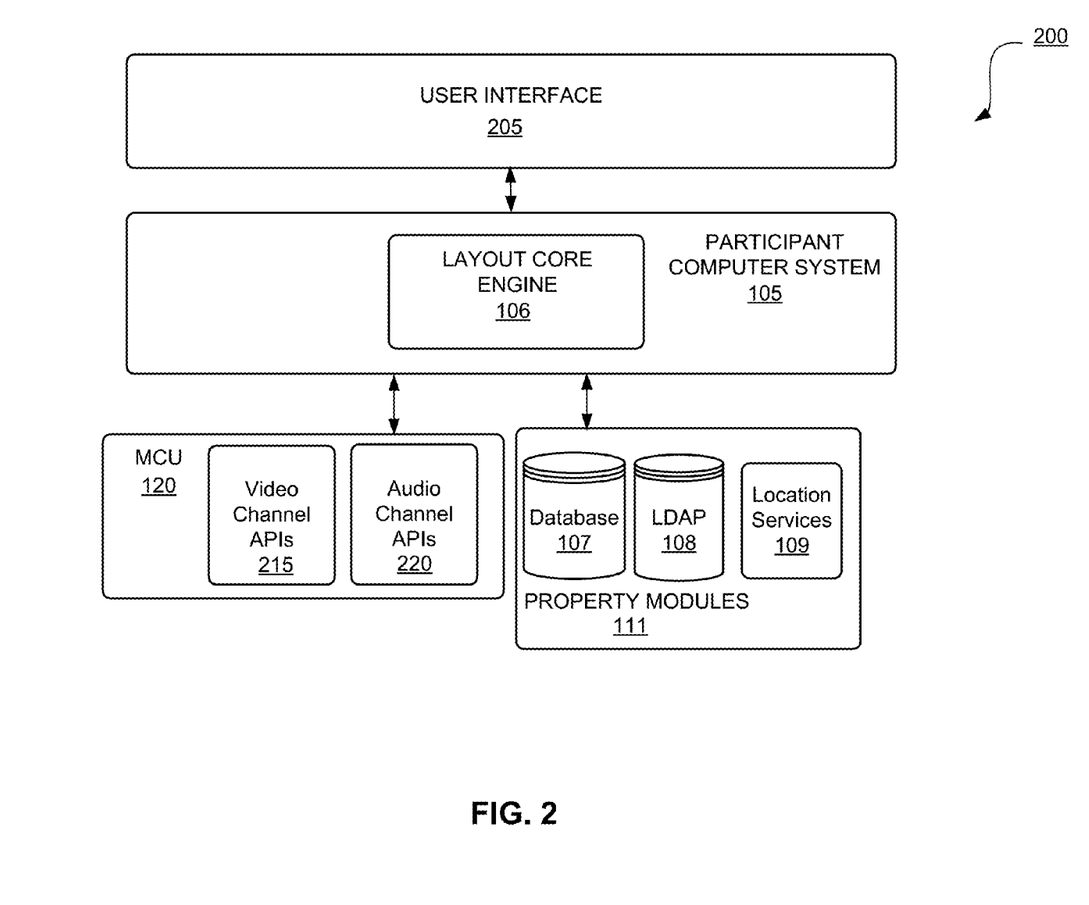
FIG. 2 illustrates a block diagram of a video conference layout implementation architecture, according to various embodiments.

FIG. 2 depicts a block diagram of a video conference layout implementation architecture 200, according to various embodiments. The architecture 200 includes a participant computer system 105 communicatively coupled to a participant interface 205, the MCU 120 (FIG. 1), and video feed property modules 111. The MCU 110 may include video channel application program interfaces (API) 215 and audio channel APIs 220. The video channel APIs 215 may create and manage video streams to and from video endpoint devices. Likewise, the audio channel APIs 220 may create and manage video streams to and from audio endpoint devices. Within a video conference the video channel APIs 215 and the audio channel APIs 220 may create and manage the streamed video and audio to and from each computer system of the video conference.

The layout core engine 106 of the participant computer system 105 may be communicatively coupled with the video channel APIs 215 and the audio channel APIs 220 to send and receive the video and audio streams of other participant computer nodes. The layout core engine 106 may use the video feed property modules 111, such as the location service 109, the LDAP services 108, and other databases 107 that store and send properties of the various participant and the participant's computer, to present the received video and audio streams to a participant of the computer system 105 at the participant interface 205 in a determined format. The participant interface 205 may be a graphical participant interface (GUI) and may be configured for a participant to provide inputs to adjust the layout of the video feeds. Also, participant interface 205 may provide audio outputs to the participant and also take in video and audio inputs that may be sent to other participants in the video conference.

During a video conference a viewer/participant of the video conference may join the conference and receive video and audio feeds of other participants within the video conference. The video and audio feeds may be streamed so that they are presented in near real-time. The participant may select a layout style that is defined by one or more video feed properties of the video feeds. The layout identified by the layout style may have a plurality of positions for the plurality of video feeds. Each position may have one or more criteria based on the one or more properties selected. A video feed may be displayed at a position in the layout when the criteria is met. The participant computer system may receive values for the property selected from the various video feeds and other video feed property modules. The layout core engine may use the values and the criteria to determine the position each video feed belongs. This may be done by matching values to criteria or ranking values and positioning video feeds in positions with a corresponding ranked criteria, for example. Once the video feeds are in their respective positions the layout is created and displayed on the electronic visual display of the participant. The property could be a geographical location property where video feeds may be positioned on the display based on the location of the participant. Another example of a property may be a role-based property where video feeds may be positioned based on the role of the participants in the conference.

Figure 3:
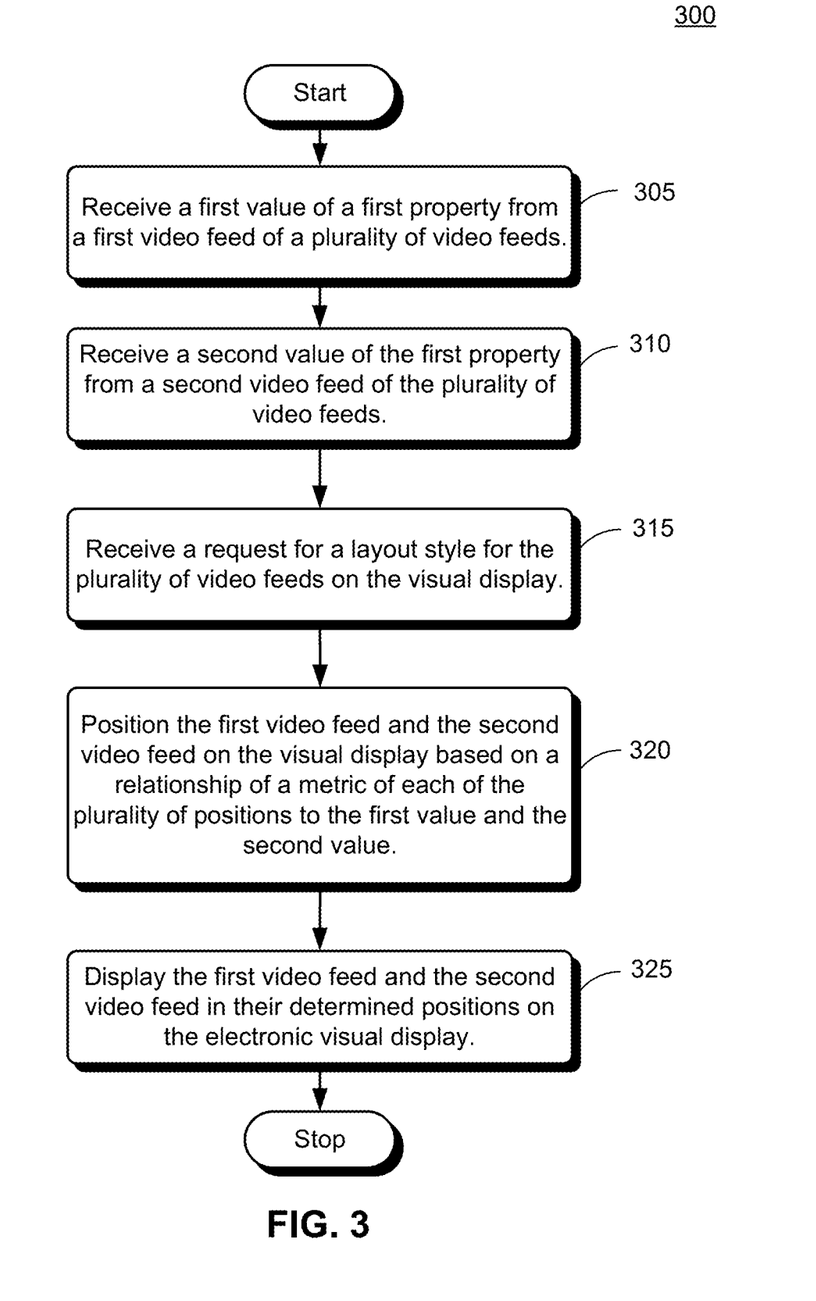
FIG. 3 illustrates a flowchart of a method of presenting the plurality of video feeds of participants in the video conference on the electronic visual display, according to various embodiments.

FIG. 3 illustrates a flowchart of a method 300 of presenting a plurality of video feeds of participants in a video conference on a visual display, according to various embodiments. In operation 305, the layout core engine 106 may receive a first value of a first property from a first video feed of a plurality of video feeds of the video conference. The value may be a location such as a city when the property is a geographical property or a position within a company when the first property is a role-based property. In operation 310, the layout core engine 106 may receive a second value of the first property from a second video feed of the plurality of video feeds. The second value and the first value may be the same in various embodiments.

In operation 315, the layout core engine 106 may receive a request for a layout style for the plurality of video feeds on the visual display. The layout style may identify a layout that has a plurality of positions for the plurality of video feeds. Each of the plurality of positions may have a criteria of the first property associated with it. For instance, when the property is a geographical location property and the video conference is a global conference, a position may have a criteria to position a video feed over India as shown on a map representation of any participant from India. The video feed may be presented over a graphical representation of India on a world map. If a role-based property is selected and the video conference is between members of an organization, one position on the electronic visual display may have a criteria that will display the video feed with the participant who is the highest ranked of the participants in the video conference.

In operation 320, the layout core engine 106 may determine which of the plurality of positions of the layout that the first video feed and the second video feed on the electronic visual display belongs based on a relationship of the criteria of each of the plurality of positions to the first value and the second value of the respective first and second video feeds. For example, the criteria may be a geographical location on the layout of a world map. There may be a plurality of positions on the map on which a video feed may be displayed. The values received by the participants of the video conference may be the geographical locations of the participants. In an embodiment, the layout core engine 106 may match the values to the locations. In other embodiments, the criteria and the values may be paired by a hierarchy. The highest value may be paired with the position that has a criteria having a highest hierarchy. In other embodiments, different algorithms may be used pair a value to a criteria of a position. In operation 325, the first and second video feeds may be displayed on the electronic visual display at their determined positions.

Figure 4:
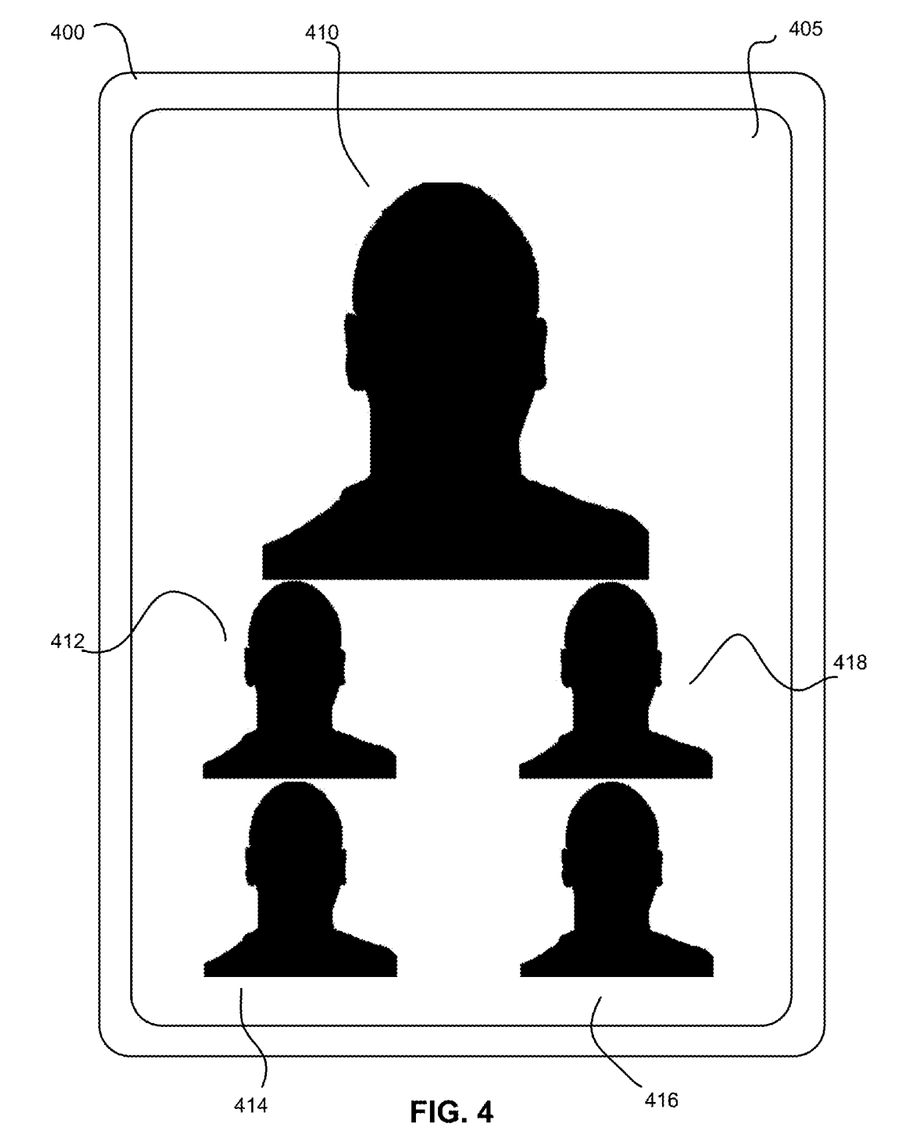
FIG. 4 illustrates a layout of video feeds of the video conference on the electronic visual display according to a role-based property of the participants of the video conference, according to various embodiments.

FIG. 4 illustrates a layout of video feeds of a video conference on an electronic visual display 400 according to a role-based property of the participants of a video conference, according to various embodiments. Positioning the videos feeds of participants based on role may allow the participant to better understand participants in the meeting at a glance. The electronic visual display 400 may display an example of a role-based property layout. The roles based property layout may be used to depict people with higher authority and rank in more prominent positions on the visual display 400. For example, during a scrum call, a participant or viewer may want to see the master and product owner in more prominent, larger views. In another example, during an all-hands or town hall meeting, personalities of higher rank (such as the vice-president of the organization) can be displayed more prominently.

In various role-based property embodiments the positions may be ranked with regards to the flow of a project. For example, a participant whose role of the project is at the beginning of the project may be on a left position or top position of the layout. A participant's role that is in the middle of the project is toward the center and a participant at the end of the project could be to the left or bottom. A participant whose functional role is at the current step of the project may be displayed more prominently than the others.

There are several ways of presenting the participants of the video conference in a role-based property layout. An embodiment is depicted in FIG. 4. In FIG. 4, the electronic visual display 400 may have a parent window 405 with a plurality of child windows 410, 412, 414, 416, and 418. The child windows may be positions in the layout selected by the participant and the number of video feeds in the video conference. Each child window may have a criteria. The criteria of child window 410 may be that the highest designated participant's video feed may be positioned in the child window 410. The other child windows 412, 414, 416, and 418 may position the remaining participants' video feeds according to their ranks. Child window 410 may display the highest designated person because it is the largest, most prominent window. In other embodiments, the position of each participant may be displayed from top to bottom based on rank. For instance, child window 410 may display the highest designated participant since it is the top child window. The child windows 412 and 418 may display the two next highest designated participants and child windows 414 and 416 may display the lowest designated participants since they are at the bottom of the parent window 405.

Figure 5:
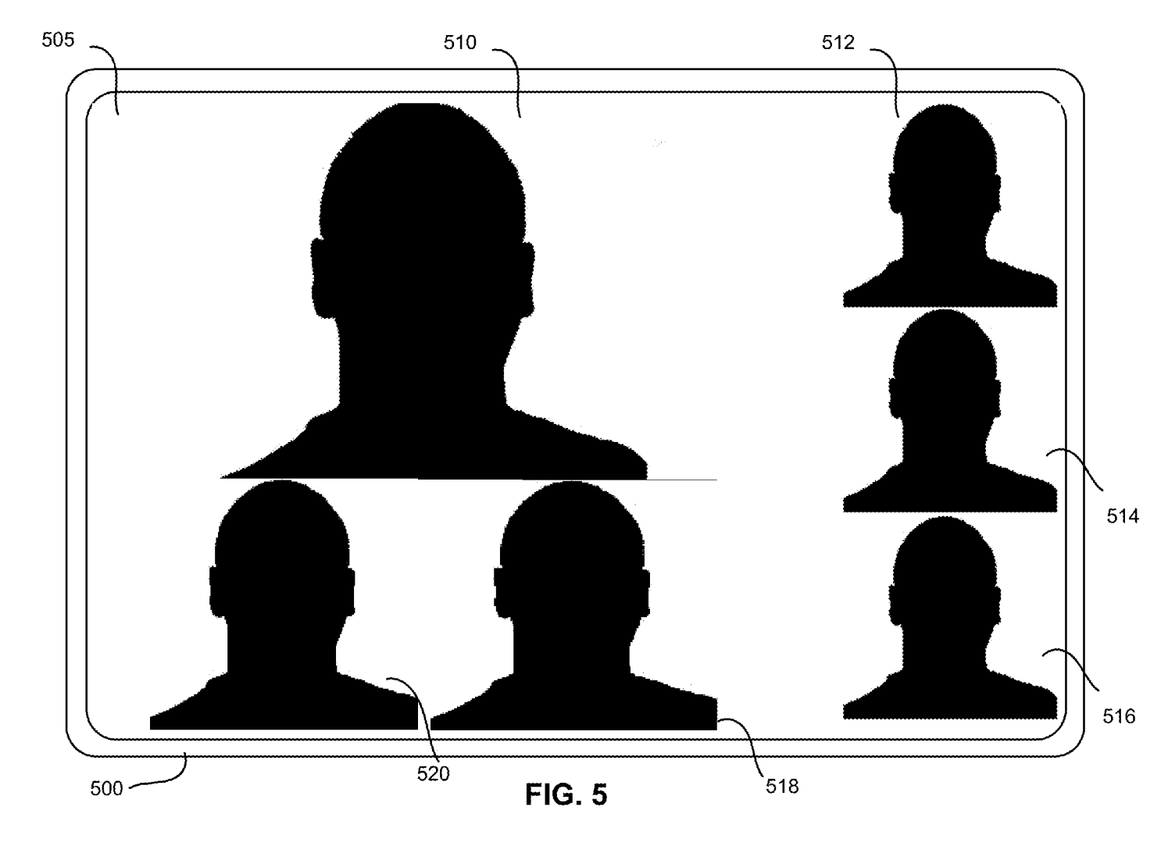
FIG. 5 illustrates an alternative embodiment of the layout of the roles based property in the electronic visual display, according to various embodiments.

FIG. 5 illustrates an alternative embodiment of a layout of the roles based property in an electronic visual display 500, according to various embodiments. Prominence of the layout may be based on size and position. In this example, the most prominent position, that may have the highest ranked designated participant, may be in child window 510 of the parent window 505. Child window 510 is the largest window and to the left. The leftmost child window may have the participant with the highest ranked value. The next most prominent positions may be child windows 518 and 520 because they are the next largest windows. Thus, the prominence may be based on size and position. The least prominent child windows with the lowest designated participants may be on the rightmost side of the visual display 500 in the smallest child windows 512, 514, and 516.

In various embodiments, the role-based property may have a property such as rank within an organization. The specific rank (e.g. vice president) may be a value of the property. In other embodiments, such as when the video conference call is being done for a specific project or specific business unit, other properties besides rank may be desired. For example, the participant may want to see the participants based on skills. For example, the participant may want to see who is more skilled in a particular technology, such as C++ and Java.

There may be several implementations for determining the roles or designations of the people in the video conference. One such implementation is facial recognition and another implementation is retrieving information from an organization's lookup database such as LDAP based on information about login credentials of a video feed. In the case of facial recognition, when a video conference takes place on a participant's computer system, the video input device de-streams the incoming media stream and the picture gets presented on continuous basis (on an average of 30 fps). When a participant (e.g. CEO) joins the video conference, then the picture available (which is de-streamed by a video input device) can trigger some face detection's software's API (e.g. OpenCV™ of Intel and an API of face.com) with the face as the input for comparison with the available faces in a database of the organization or group. The response may contain profile details and the role of that participant in the organization or group. Once information on the designation or role is retrieved, the child windows of the electronic visual display may be rearranged.

Consistent with embodiments, if the role-based property supports associating a video feed with the logged-in individual, then this information could be directly used to determine the designation or role of the participant. Once login information on the designation or role is retrieved, the child windows may be repositioned based on the information. The implementation could use a mechanism of callbacks so that once information about the presenting participant's profile is available, a triggered callback would be sent to the layout core engine 106 of FIG. 1 for further action. In order to make it more obvious, the role may be mentioned below the child windows of some or all of the child windows with the name of the participant and the participant's role. In embodiments, the login information may be used to retrieve role or designation from an organizations LDAP. In various embodiment, a combination of facial recognition and LDAP lookup may be used to determine a role-based property.

Using session initiation protocol (SIP) event framework (SIP subscribe notify) (RFC 4575), participant computer systems can notify participant roles to the subscriber (which can be the MCU 120). Participant roles can be mentioned in <roles> value in conference event package notification to subscribed participant computer systems. Since there is no fixed semantics associated with these values, they may be used to define organization roles and the computer system can use them in layout core engine 106. For example, the layout core engine 106 may display certain roles in prominent positions. The layout of roles may be static in various embodiments. In other embodiments the positioning of video feeds based on roles may be dynamic. Whenever roles change, then the SIP conference package notification may be generated by SIP computer system and the subscribed computer systems will change layouts based on this changed information. One use case may be a video conference in which a participant designates another participant as a moderator during the video conference. The new moderator may be given the prominent position in the video layout.

Figure 6:
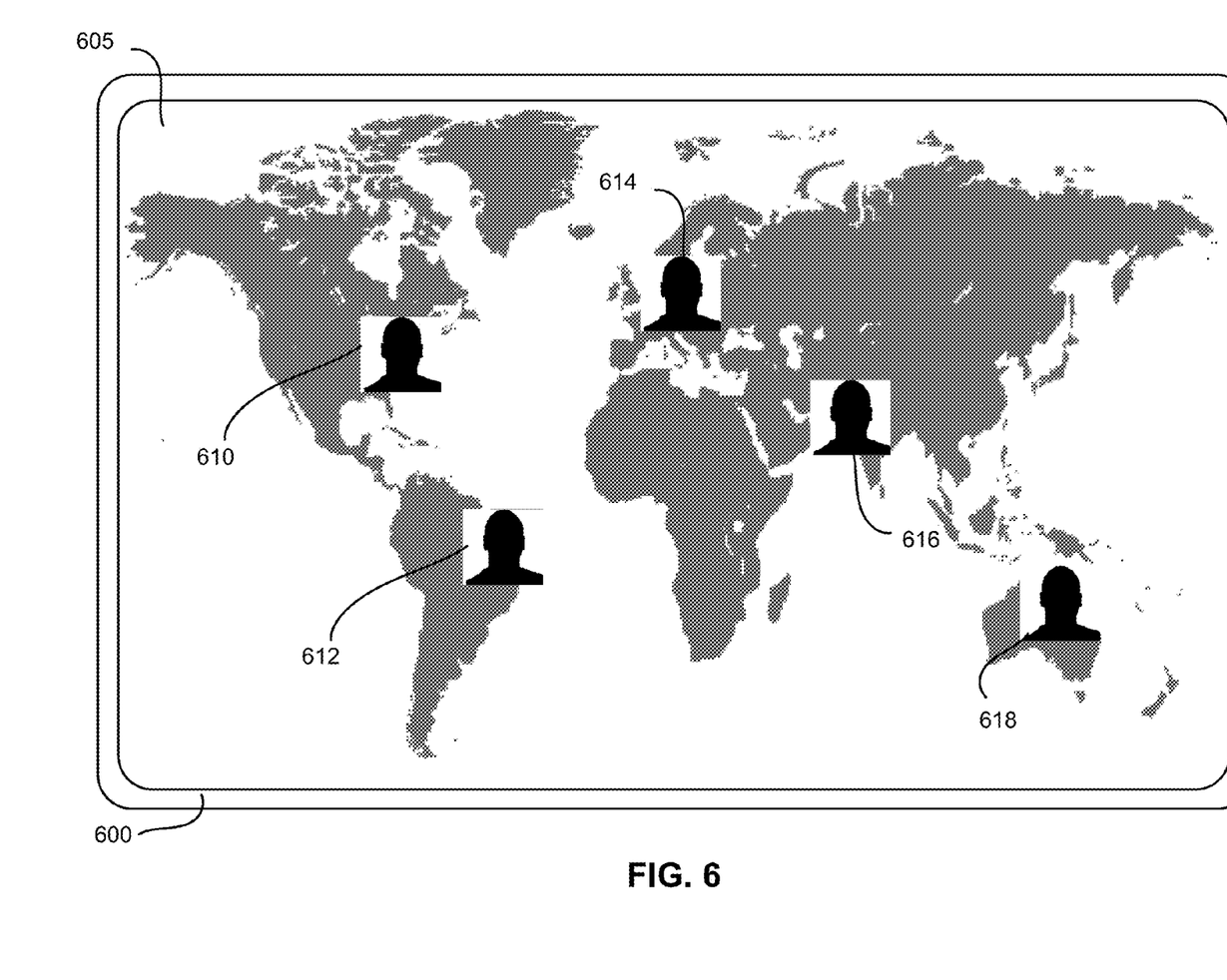
FIG. 6 illustrates an electronic visual display of a video conference layout based on a geographical location property, according to various embodiments.

FIG. 6 illustrates an electronic visual display 600 of a video conference layout based on a geographical location property, according to various embodiments. The layout core engine 106 of FIG. 1 may formulate a display of video feeds of a video conference based on the video property of geographical location of the video feeds. The layout core engine 106 may use the location services module 109 of FIG. 1. Each video feed may be positioned on the electronic visual display based on the geographical location of the video feed. The formatting of the display of the geographical property may be done in several ways.

In various embodiments, the layout based on geographical properties may take the form of a parent window 605 illustrating a two-dimensional world map on an electronic visual display 600. The example video conference illustrated in FIG. 6 may have a participant from New York City, United States; Sao Paulo, Brazil; Munich, Germany; Pune, India; and Sydney, Australia. The layout core engine 106 may receive the value of the geographical property of each participant, which may be the location of the participant. Once having the value, the layout core engine 106 may compare the values received to the criteria for each position of the geographical layout. The layout core engine 106 may match the value received for each video feed to the location on the two dimensional map displayed in the parent window 605. For instance the value of New York City, United States could be matched with the criteria of position 610 and the video feed from that participant may be positioned there. Likewise, the Sao Paulo participant may be matched with position 612, the Munich participant may be matched with position 614, the Pune participant may be matched with position 616, and the Sydney participant may be matched with position 618.

In other various embodiments, the layout may be on a smaller scale for positions such as across a country, state, city, or even within a building where there are several participants. In other embodiments, the parent window 605 may not have a map but have different rectangles within a video layout that represents each of an organization's office locations. For example, rectangles as illustrated in FIG. 4 and FIG. 5 could be a different location. A more prominent location may appear in a larger area rectangle.

Figure 7:
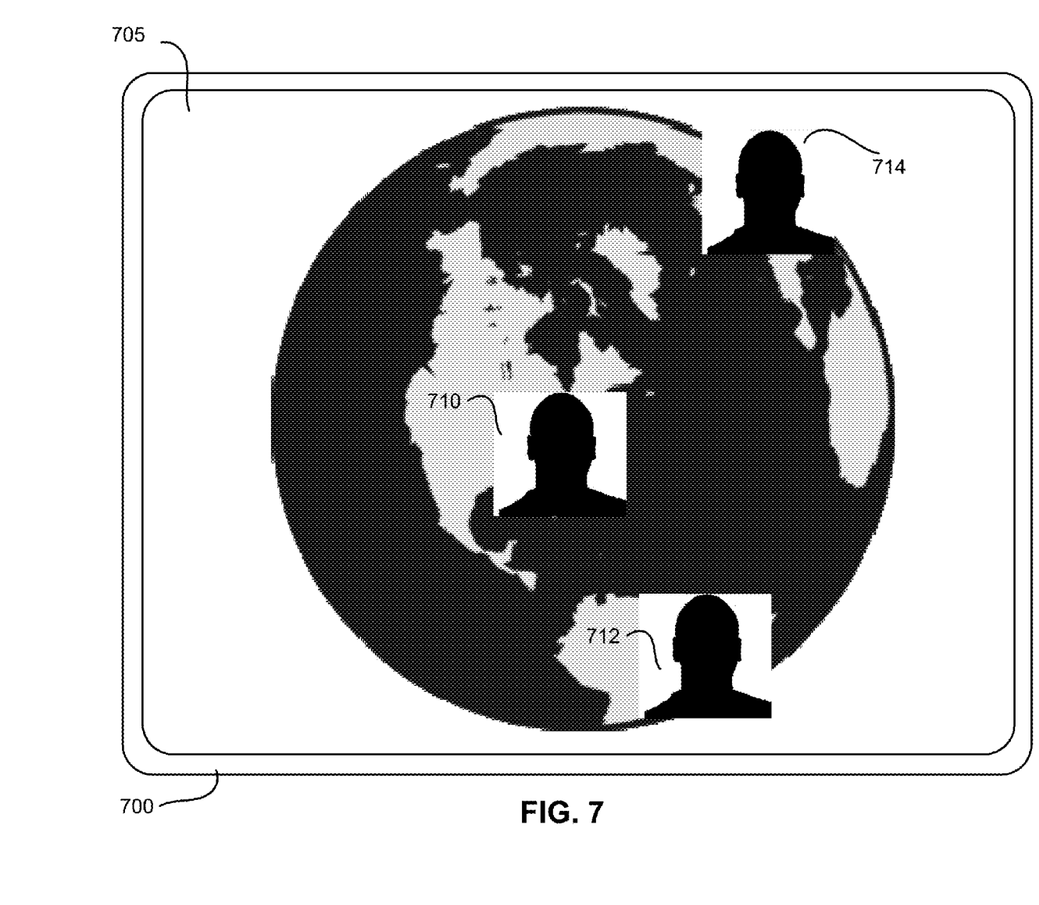
FIG. 7 illustrates another layout of a geographical location property displayed on an electronic visual display, according to various embodiments.

FIG. 7 illustrates another layout of the geographical property displayed on an electronic visual display 700, according to various embodiments. In this example of a geographical layout, a parent window 705 may have a three-dimensional globe having a plurality of positions defined by a geographical location criteria. Using the participant locations discussed in FIG. 7, the New York City participant may have a property value of New York City which matches with the position 710 of the geographical layout. Likewise, the participant from Sao Paulo matches the criteria of position 712 and the Munich participant matches the criteria of position 714. The participant viewing the display may rotate the globe to view other video feeds that are positioned on the other side of the sphere not being viewed. In other embodiments, the non-visible video feeds may appear through the globe and may have an indication that the location is on the other side of the globe. In other embodiments, the layout core engine 106 of FIG. 1 may be configured to automatically rotate the globe to display the participant speaking in a prominent view.

Figure 8:
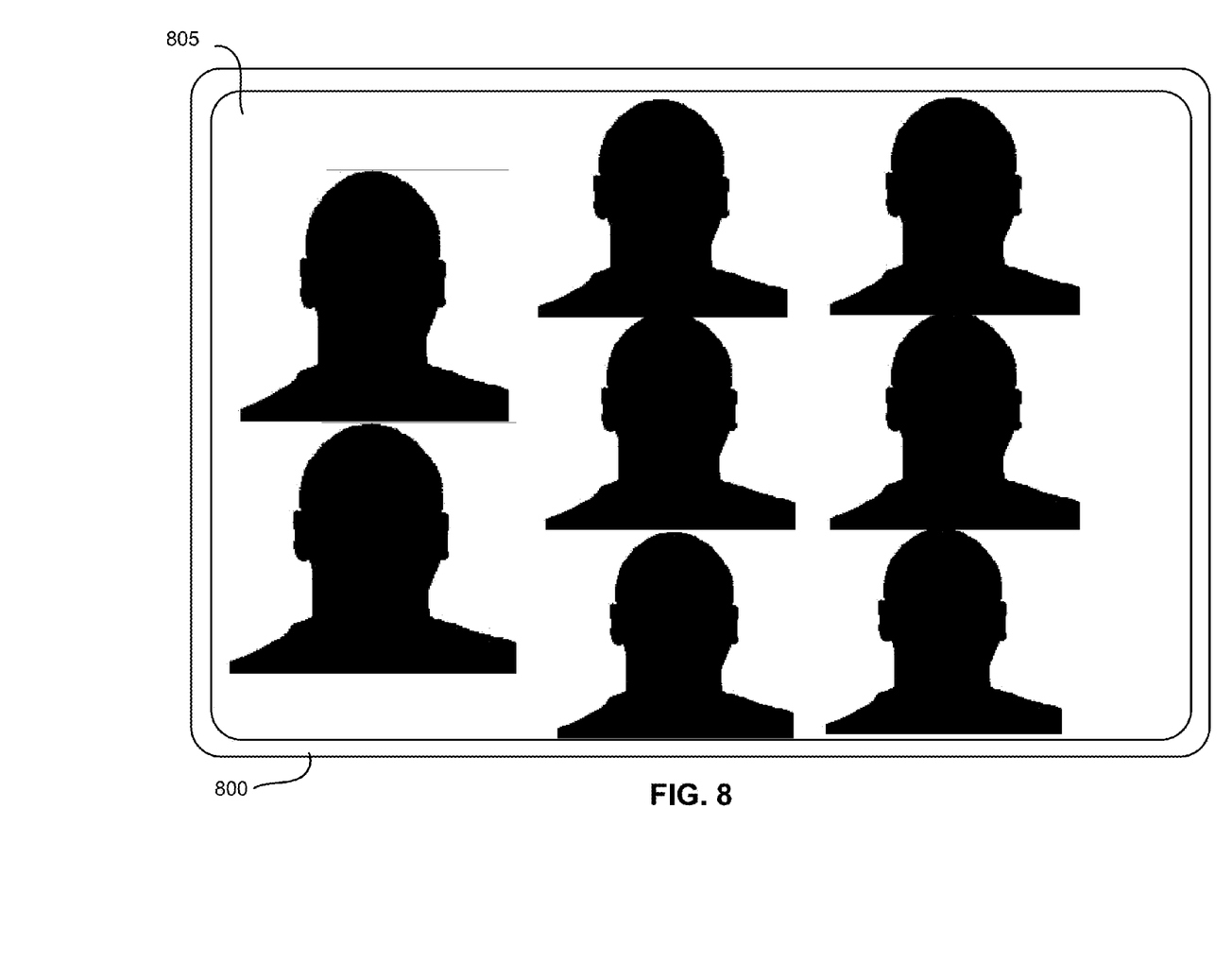
FIG. 8 illustrates another possible video feed layout of the video conference based on the geographical location property, according to various embodiments.

FIG. 8 illustrates yet another possible video feed layout of a video conference based on a geographical location property, according to various embodiments. In this layout, an electronic visual display 800 may display a parent window 805 having a plurality of video feed positions. A map may not be present in this example but the video feeds may be laid out in a grid. The position of the video feeds may be based on the relationship of a cardinal location of each video feed to the other video feeds. For example, the video feeds in the child windows may be positioned based on cardinal location so that the child windows may have the furthest western participant on the left side of the parent window 805. The centrally located participants maybe in the center of the parent window 805. The eastern most participants may be on the right side of the parent window. The location of the participants from northern most participant to southern most participant may also be defined in the upper most positions of the parent screen 805 showing the north participants and the lower portion of the parent window 805 showing the south participants. For example, the participants in the left most column could be the ones from the west of the Atlantic, the ones in the center from Africa and Europe with Europe on top and Africa on the bottom, and the final column on the right most column of the parent window 805 from Asia and Australia. In embodiments, other rules may be applied to this layout. In other embodiments, the layout may be determined by other geographical factors such as country, state, and city instead of global references.

Referring to FIG. 6, FIG. 7, and FIG. 8 when positioning the video feeds of the participants of the video conference the layout core engine 106 may need to obtain the property value of geographical location for each video feed. In various embodiments, the layout core engine may access the location services 109 of FIG. 1. In various embodiments, the location services 109 may determine the geographical location value based on the internet protocol (IP) address of the video feed. The criteria of the positions may be IP addresses of geographical locations. When an IP address is received from a participant, the layout core engine 106 of FIG. 1 may map the participant's IP address to that of the criteria. In addition to the IP address of the participant, the MAC address of the router that the participant is connected to can be used.

In various embodiments, more precise location fingerprinting may be done by location services 109 based on the information about visible Wi-Fi access points, as well as cell towers and global positioning systems (GPS), depending on device support. Other location indicators such as login credentials may be used to determine the location of a participant. For example, if the login for the video conference is an email address of the organization and the email address indicates the country the participant is located, then this information may be used by the layout core engine 106 to determine location. In various embodiments, a combination of the location information discussed above may be used to determine a participant's location.

In various embodiments, that may also occur in the geographical and role-based properties, the layout core engine 106 may be configured to allow a participant to pin videos to specific positions of the parent window. If there are regular meetings with a fixed set of participants, then the layout core engine 106 may be configured to allow the participant to select a position to pin each participant. For example, this may be done during regular status meetings. The next time the participant joins the meeting, participants will show up in the squares to which they had been previously pinned.

In various embodiments, the layout of the shapes that define the positions of various values may be different based on different factors. For example, a person sitting at an office desk may be viewed with a different attribute than a person sitting in a meeting room. The participant in the office desk may be viewed with a narrower rectangle, for example. In other various embodiments, when there are two participants talking to each other, the video conference layout may be configured to allow a moderator to control the layout so that the moderator may put the two people or group of people talking to each other in a position that would make them appear together or in a more prominent position.

Figure 9:
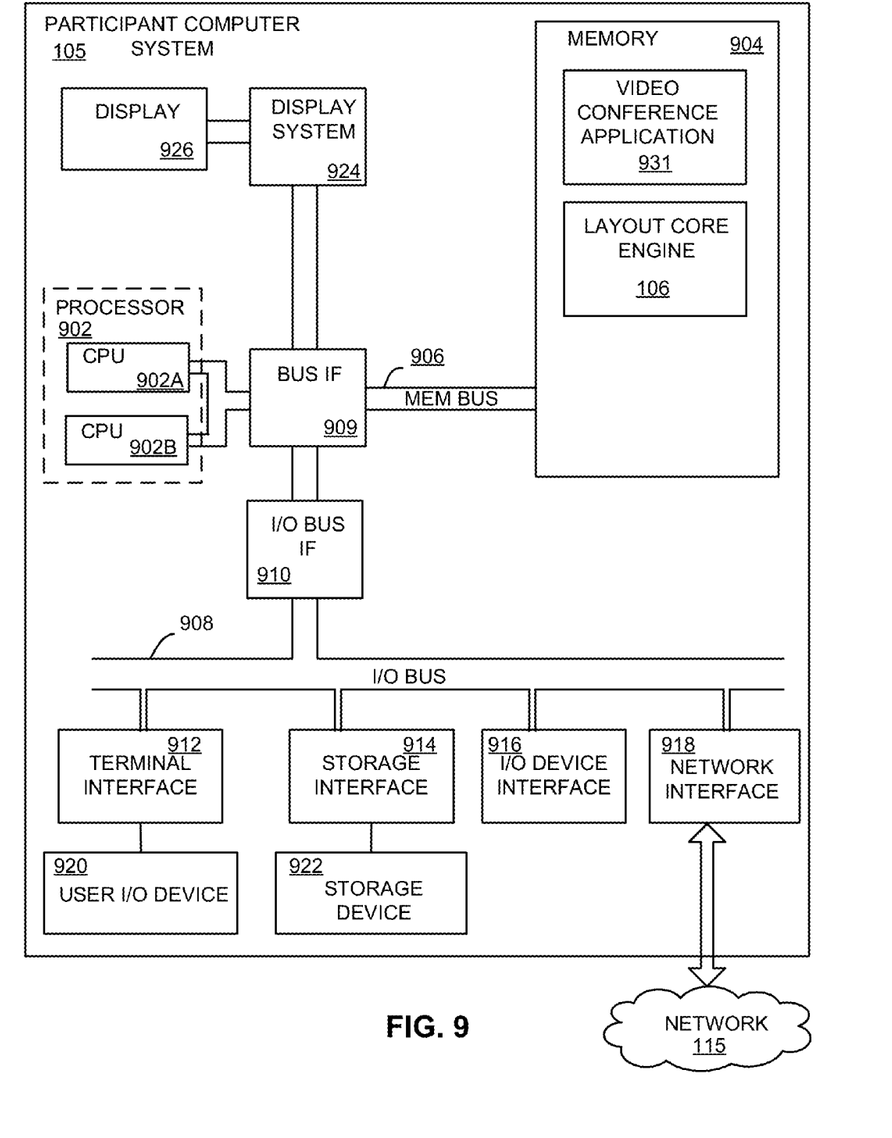
FIG. 9 is a schematic block diagram illustrating various embodiments of the participant computer system of FIG. 1.

FIG. 9 is a schematic block diagram illustrating various embodiments of the participant computer system 105 of FIG. 1. The participant computer system 105 is one example context in which embodiments may be implemented. The mechanisms and apparatus of the various embodiments disclosed herein apply equally to any appropriate computing system. The major components of the participant computer system 105 include one or more processors 902, a memory 904, a terminal interface 912, a storage interface 914, an input/output ("I/O") device interface 916, and a network interface 918, all of which are communicatively coupled, directly or indirectly, for inter-component communication via a memory bus 906, an I/O bus 908, bus interface unit ("IF") 909, and an I/O bus interface unit 910.

The participant computer system 105 may contain one or more general-purpose programmable central processing units (CPUs) 902A and 902B, herein generically referred to as the processor 902. In an embodiment, the participant computer system 105 may contain multiple processors; however, in another embodiment, the participant computer system 105 may alternatively be a single CPU system. Each processor 902 executes instructions stored in the memory 904 and may include one or more levels of on-board cache.

In an embodiment, the memory 904 may include a random-access semiconductor memory, storage device, or storage medium (either volatile or non-volatile) for storing or encoding data and programs. In various embodiments, the memory 904 represents the entire virtual memory of the participant computer system 105, and may also include the virtual memory of other computer systems coupled to the participant computer system 105 or connected via a network 115. The memory 904 is conceptually a single monolithic entity, but in other embodiments the memory 904 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 904 may store all or a portion of the following: a video conference application 931 and a layout core engine 106. These programs and data structures are illustrated as being included within the memory 904 in participant computer system 105, however, in other embodiments, some or all of them may be on different computer systems and may be accessed remotely, e.g., via a network 115. The participant computer system 105 may use virtual addressing mechanisms that allow the programs of the participant computer system 105 to behave as if they only have access to a large, single storage entity instead of access to multiple, smaller storage entities. Thus, while the video conference application 931 and the layout core engine 106 are illustrated as being included within the memory 904, they may not necessarily all be completely contained in the same storage device at the same time.

In an embodiment, the video conference application 931 and the layout core engine 106 may include instructions or statements that execute on the processor 902 or instructions or statements that are interpreted by instructions or statements that execute on the processor 902 to carry out the functions as further described below. In another embodiment, the video conference application 931 and the layout core engine 106 may be implemented in hardware via semiconductor devices, chips, logical gates, circuits, circuit cards, and/or other physical hardware devices in lieu of, or in addition to, a processor-based system. In an embodiment, the video conference application 931 and the layout core engine 106 may include data in addition to instructions or statements. In various embodiments, one or more computer systems 105-1-105-N, the conference management unit 110, and the MCU 120 of FIG. 1 may contain the video conference application 931 and the layout core engine 106.

The participant computer system 105 may include a bus interface unit 909 to handle communications among the processor 902, the memory 904, a display system 924, and the I/O bus interface unit 910. The I/O bus interface unit 910 may be coupled with the I/O bus 908 for transferring data to and from the various I/O units. The I/O bus interface unit 910 communicates with multiple I/O interface units 912, 914, 916, and 918, which are also known as I/O processors (IOPs) or I/O adapters (IOAs), through the I/O bus 908. The display system 924 may include a display controller, a display memory, or both. The display controller may provide video, audio, or both types of data to a display device 926. The display memory may be a dedicated memory for buffering video data. The display system 924 may be coupled with a display device 926, such as a standalone display screen, computer monitor, television, or a tablet or handheld device display. In an embodiment, the display device 926 may include one or more speakers for rendering audio. In an embodiment, the display device 926 may include one or more microphones for capturing audio inputs. Alternatively, one or more speakers for rendering audio and one or more microphones for capturing audio inputs may be coupled with an I/O interface unit. In alternate embodiments, one or more of the functions provided by the display system 924 may be on board an integrated circuit that also includes the processor 902. In addition, one or more of the functions provided by the bus interface unit 909 may be onboard an integrated circuit that also includes the processor 902.

The I/O interface units support communication with a variety of storage and I/O devices. For example, the terminal interface unit 912 supports the attachment of one or more participant I/O devices 920, which may include participant output devices (such as a video display device, speaker, and/or television set) and participant input devices (such as a keyboard, mouse, keypad, touchpad, trackball, buttons, light pen, or other pointing device). A participant may manipulate the participant input devices using a participant interface, in order to provide input data and commands to the participant I/O device 920 and the participant computer system 105, and may receive output data via the participant output devices. For example, a participant interface may be presented via the participant I/O device 920, such as displayed on a display device, played via a speaker, or printed via a printer.

The storage interface 914 supports the attachment of one or more disk drives or direct access storage devices 922 (which are typically rotating magnetic disk drive storage devices, although they could alternatively be other storage devices, including arrays of disk drives configured to appear as a single large storage device to a host computer, or solid-state drives, such as flash memory). In another embodiment, the storage device 922 may be implemented via any type of secondary storage device. The contents of the memory 904, or any portion thereof, may be stored to and retrieved from the storage device 922 as needed. The I/O device interface 916 provides an interface to any of various other I/O devices or devices of other types, such as printers or fax machines. The network interface 918 provides one or more communication paths from the participant computer system 105 to other digital devices and computer systems; these communication paths may include, e.g., one or more networks 115.

Although the participant computer system 105 shown in FIG. 9 illustrates a particular bus structure providing a direct communication path among the processors 902, the memory 904, the bus interface 909, the display system 924, and the I/O bus interface unit 910, in alternative embodiments the participant computer system 105 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 910 and the I/O bus 908 are shown as single respective units, the participant computer system 105 may, in fact, contain multiple I/O bus interface units 910 and/or multiple I/O buses 908. While multiple I/O interface units are shown, which separate the I/O bus 908 from various communications paths running to the various I/O devices, in other embodiments, some or all of the I/O devices are connected directly to one or more system I/O buses.

In various embodiments, the participant computer system 105 is a multi-participant mainframe computer system, a single-participant system, or a server computer or similar device that has little or no direct participant interface, but receives requests from other computer systems (clients). In other embodiments, the participant computer system 105 may be implemented as a desktop computer, portable computer, laptop or notebook computer, tablet computer, pocket computer, telephone, smart phone, or any other suitable type of electronic device.

Embodiments may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the participant's computer, partly on the participant's computer, as a stand-alone software package, partly on the participant's computer and partly on a remote computer or entirely on the remote computer or server. In the latter scenario, the remote computer may be connected to the participant's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for presenting a plurality of video feeds of participants in a video conference on an electronic visual display, the computer program product including a non-transitory computer readable storage medium having program instructions embodied therewith, the program instructions readable by a processing circuit to cause the processing circuit to perform a method comprising:
   selecting a first property of the plurality of video feeds, wherein the first property is a role-based property of each participant in the plurality of video feeds and is used to position the plurality of video feeds on the electronic visual display;
   receiving a first value of the first property from a first video feed of the plurality of video feeds;
   receiving a second value of the first property from a second video feed of the plurality of video feeds;
   receiving a request for a first layout style of the plurality of video feeds on the visual display, wherein the first layout style includes a plurality of positions for the plurality of video feeds, the plurality of positions being arranged in a sequence corresponding with a project, each of the plurality of positions having a criteria of the first property, wherein each of the criteria correspond with a position in a flow of the project, the first layout style further providing for a display of a position corresponding with a current step of the project more prominently than a step that is not a current step of the project;
   positioning the first video feed and the second video feed on the visual display based on a relationship of the criteria of each of the plurality of positions to the first value and the second value; and
   sending the first video feed and the second video feed in their determined positions of the layout style to be displayed on the electronic visual display.

2. The computer program product of claim 1, receiving a request for a second layout style of the plurality of video feeds on the visual display, wherein the second layout style has a plurality of positions for the plurality of video feeds, each of the plurality of positions having a criteria of the first property, wherein the criteria is a hierarchal rank of each position in accordance to a prominence of the position on the electronic visual display.

3. The computer program product of claim 1, wherein the role-based property values are based on a job in the organization of a participant on the plurality of video feeds.

4. The computer program product of claim 3, wherein the role-based property values are based on a skill of a participant on the plurality of video feeds.

5. The computer program product of claim 1, wherein the first and second values of the role-based property are obtained from a lightweight directory access protocol (LDAP) service.

6. The computer program product of claim 1, wherein the role of a participant of a video feed is determined by using facial recognition by comparing a face of a participant in the video feed to a database of profiles having facial pictures of members of a group and their respective roles in the group.

7. The computer program product of claim 1, the method further comprising:
   dynamically updating the positions of the first and second video feeds based on changes in the respective first value and second value.

8. A computer system for presenting a plurality of video feeds of participants in a video conference on an electronic visual display, the system comprising:
   a memory having computer readable instructions; and
   a processor configured to execute the computer readable instructions to:
   select a first property of the plurality of video feeds, wherein the first property is a role-based property of each participant in the plurality of video feeds and is used to position the plurality of video feeds in a respective plurality of child windows within a parent window on the electronic visual display, each of the plurality of child windows occupying a distinct position within the parent window;
   receive a first value of the first property from a first video feed of the plurality of video feeds;
   receive a second value of the first property from a second video feed of the plurality of video feeds;
   receive a request for a layout style of the plurality of video feeds on the visual display, wherein the layout style has a plurality of positions for displaying the plurality of video feeds in respective ones of the plurality of child windows, each of the plurality of positions having a criteria of the first property;
   position the first video feed in a first child window in a first position and the second video feed in a second child window in a second position on the visual display based on a relationship of the criteria of each of the plurality of positions to the first value and the second value;
   send the first video feed and the second video feed in their determined positions of the layout style to be displayed on the electronic visual display;
   receive a request to adjust the layout style, wherein the request specifies that the first video feed be displayed in a third child window in a third position; and
   adjusting the layout style and sending the first video feed to the third child window in a third position.

9. The computer system of claim 8, wherein the plurality of child windows are arranged in a sequence corresponding with a project, each of the criteria correspond with a position in a flow of the project, and the layout style provides for more prominent display of a child window corresponding with a current step of the project than of a step that is not a current step of the project.

\* \* \* \* \*